United States Patent
Chou

(10) Patent No.: US 9,936,431 B2
(45) Date of Patent: Apr. 3, 2018

(54) PERFORMANCE MONITORING OF WIRELESS LOCAL AREA NETWORK (WLAN) OFFLOADING IN WIRELESS CELLULAR NETWORKS

(71) Applicant: INTEL CORPORATION, Santa Clara, CA (US)

(72) Inventor: Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 14/128,018

(22) PCT Filed: Oct. 10, 2013

(86) PCT No.: PCT/US2013/064301
§ 371 (c)(1),
(2) Date: Dec. 20, 2013

(87) PCT Pub. No.: WO2014/107206
PCT Pub. Date: Jul. 10, 2014

(65) Prior Publication Data
US 2015/0103648 A1    Apr. 16, 2015

Related U.S. Application Data

(60) Provisional application No. 61/748,706, filed on Jan. 3, 2013.

(51) Int. Cl.
*H04W 24/00*    (2009.01)
*H04W 36/14*    (2009.01)
(Continued)

(52) U.S. Cl.
CPC ............ *H04W 36/14* (2013.01); *H04B 7/024* (2013.01); *H04B 7/0486* (2013.01);
(Continued)

(58) Field of Classification Search
None
See application file for complete search history.

(56) References Cited

U.S. PATENT DOCUMENTS

2005/0059422 A1* 3/2005 Rudolf et al. ................. 455/522
2007/0281683 A1* 12/2007 Goulet .................. H04W 24/04
455/423
(Continued)

FOREIGN PATENT DOCUMENTS

KR  10-2005-0066286 A   6/2005
TW      201440545 A    10/2014
(Continued)

OTHER PUBLICATIONS

International Search Report and Written Opinion received for PCT Patent Application No. PCT/US2013/064301, dated Jan. 28, 2014, 9 pages.
(Continued)

*Primary Examiner* — Hassan Phillips
*Assistant Examiner* — Ayanah George
(74) *Attorney, Agent, or Firm* — Grossman, Tucker, Perreault & Pfleger, PLLC

(57) ABSTRACT

Generally, this disclosure provides devices, systems and methods for performance monitoring of WLAN data traffic offloading in wireless cellular networks. A wireless local area network (WLAN) access point (AP) may include a performance measurement module to measure the number of User Equipment (UEs) connected to the WLAN AP for data traffic offload and further to measure packet throughput from the UEs to the WLAN AP; a measurement granularity timer to trigger the performance measurement module to perform the measurements; a performance report generation module to generate a WLAN report based on the measurements provided from the performance measurement module; and a
(Continued)

performance report timer to trigger the performance report generation module to generate the WLAN report.

11 Claims, 10 Drawing Sheets

(51) Int. Cl.

| | | |
|---|---|---|
| H04W 24/10 | (2009.01) | |
| H04B 7/06 | (2006.01) | |
| H04B 7/04 | (2017.01) | |
| H04J 11/00 | (2006.01) | |
| H04W 72/04 | (2009.01) | |
| H04B 7/024 | (2017.01) | |
| H04W 56/00 | (2009.01) | |
| H04W 72/00 | (2009.01) | |
| H04W 88/08 | (2009.01) | |
| H04L 29/06 | (2006.01) | |
| H04W 36/00 | (2009.01) | |
| H04W 48/08 | (2009.01) | |
| H04W 68/00 | (2009.01) | |
| H04W 28/02 | (2009.01) | |
| H04W 36/22 | (2009.01) | |
| H04W 48/16 | (2009.01) | |
| H04W 52/02 | (2009.01) | |
| H04W 76/02 | (2009.01) | |
| H04L 12/46 | (2006.01) | |
| H04L 29/12 | (2006.01) | |
| H04W 12/02 | (2009.01) | |
| H04W 88/06 | (2009.01) | |
| H04W 84/12 | (2009.01) | |
| H04L 5/00 | (2006.01) | |
| H04W 88/16 | (2009.01) | |
| H04W 8/08 | (2009.01) | |

(52) U.S. Cl.
CPC ......... *H04B 7/0626* (2013.01); *H04B 7/0632* (2013.01); *H04J 11/0053* (2013.01); *H04L 5/0053* (2013.01); *H04L 12/4641* (2013.01); *H04L 61/2007* (2013.01); *H04L 63/304* (2013.01); *H04L 63/306* (2013.01); *H04W 12/02* (2013.01); *H04W 24/10* (2013.01); *H04W 28/0268* (2013.01); *H04W 36/0005* (2013.01); *H04W 36/0055* (2013.01); *H04W 36/22* (2013.01); *H04W 48/08* (2013.01); *H04W 48/16* (2013.01); *H04W 52/0222* (2013.01); *H04W 56/005* (2013.01); *H04W 56/0015* (2013.01); *H04W 56/0095* (2013.01); *H04W 68/00* (2013.01); *H04W 72/005* (2013.01); *H04W 72/042* (2013.01); *H04W 72/0413* (2013.01); *H04W 76/02* (2013.01); *H04W 76/021* (2013.01); *H04W 76/023* (2013.01); *H04W 88/08* (2013.01); *H04L 5/0057* (2013.01); *H04W 8/082* (2013.01); *H04W 36/0011* (2013.01); *H04W 84/12* (2013.01); *H04W 88/06* (2013.01); *H04W 88/16* (2013.01); *Y02B 60/50* (2013.01)

(56) References Cited

U.S. PATENT DOCUMENTS

| | | | | |
|---|---|---|---|---|
| 2007/0298810 A1* | 12/2007 | Kasher | ............... | H04W 16/14 455/452.1 |
| 2008/0267079 A1* | 10/2008 | Mhatre | ............ | H04W 74/0808 370/248 |
| 2009/0209250 A1* | 8/2009 | Huq | ............... | 455/425 |
| 2010/0190488 A1 | 7/2010 | Jung et al. | | |
| 2010/0226339 A1* | 9/2010 | Stephenson | ........... | H04W 24/08 370/332 |
| 2010/0329132 A1* | 12/2010 | Raghothaman | ..... | H04W 52/325 370/252 |
| 2011/0222523 A1 | 9/2011 | Fu et al. | | |
| 2012/0026865 A1* | 2/2012 | Fan | ............ | H04W 76/02 370/225 |
| 2012/0184301 A1* | 7/2012 | Jovicic | .......... | G01S 5/0081 455/456.5 |
| 2012/0196644 A1* | 8/2012 | Scherzer | ............ | H04W 72/02 455/524 |
| 2012/0230191 A1* | 9/2012 | Fang | ............ | H04W 36/22 370/235 |
| 2012/0324100 A1* | 12/2012 | Tomici | ........... | H04L 45/123 709/224 |
| 2013/0114446 A1* | 5/2013 | Liu | ............ | H04W 24/10 370/252 |
| 2013/0308445 A1* | 11/2013 | Xiang | ............ | H04W 28/0231 370/230 |
| 2014/0254398 A1* | 9/2014 | Li et al. | ............ | 370/252 |
| 2015/0341817 A1 | 11/2015 | Davydov et al. | | |
| 2015/0341818 A1 | 11/2015 | Han et al. | | |

FOREIGN PATENT DOCUMENTS

| | | | |
|---|---|---|---|
| WO | 2012/050387 A2 | 4/2012 | |
| WO | 2012/148482 A1 | 11/2012 | |
| WO | WO 2014175882 A1 * | 10/2014 | ............ H04W 24/10 |

OTHER PUBLICATIONS

Zhang, et al., "Efficient Mobility Management for Vertical Handoff between WWAN and WLAN", IEEE Communications Magazine vol. 41, No. 11, Nov. 2003, pp. 102-108.

Office Action received for Taiwan Application No. 103100053, dated Jul. 28, 2015, 12 pages of English translation and 13 pages of Taiwan Office Action.

Intel, "pCR WLAN PM and FM use cases," 3GPP TSG SA WG5 Meeting #85, S5-122277, Oct. 8-12, 2012, Chapter 5 on pp. 1 and 2.

Intel, "pCR WLAN management architecture," 3GPP TSG SA WG5 Meeting #85, S5-122275, Oct. 8-12, 2012, Fig. 4.1; Chapter 4 on pp. 1 and 2.

Extended European Search Report issued in European Application No. 13870265.9-1857, dated Aug. 16, 2016.

Taiwanese Office Action and Search Report issued in Taiwanese Application No. 104143864, dated Oct. 5, 2016, with English translation.

CMCC Et al.: "WLAN Management Discussion Paper", 3GPP Draft; S5-120217 WLAN Discussion Paper, 3rd Generation Partnership Project (3GPP), Mobile Competence Centre; 650, Route Des Lucioles F-06921 Sophia-Antipolis Cedex; France, vol. SA WG5, no. Dresden, Germany; Feb. 6-10, 2012, Jan. 30, 2012 (Jan. 30, 2012), XP050579376 [retrieved on Jan. 30, 2012].

INTEL: "Text proposal to WLAN management TR", 3GPP Draft; S5-121724 WLAN Use Case, 3rd Generation Partnership Project (3GPP), Mobile Competence Centre; 650, Route Des Lucioles; F-06921 Sophia-Antipolis Cedex; France, vol. SA WG5, no. Berlin; Aug. 20-24, 2012, Aug. 10, 2012 (Aug. 10, 2012), XP050688110, Retrieved from the Internet: URL:http://www.3gpp.org/ftp/tsg_sa/WG5_TM/TSGS5_84/Docs/ [ retrieved on Aug. 10, 2012].

* cited by examiner

500 dot11QosCountersTable OBJECT-TYPE
    SYNTAX SEQUENCE OF Dot11QosCountersEntry
    MAX-ACCESS not-accessible
    STATUS current
    DESCRIPTION
        "Group containing attributes that are MAC counters
        implemented as a table to allow for multiple instantiations
        on an agent."
    ::= { dot11mac 6 }

*(502)*

Dot11QosCountersEntry ::=
    SEQUENCE {

| Field | Type |
|---|---|
| dot11QosCountersIndex | INTEGER, |
| dot11QosTransmittedFragmentCount | Counter32, |
| dot11QosFailedCount | Counter32, |
| dot11QosRetryCount | Counter32, |
| dot11QosMultipleRetryCount | Counter32, |
| dot11QosFrameDuplicateCount | Counter32, |
| dot11QosRTSSuccessCount | Counter32, |
| dot11QosRTSFailureCount | Counter32, |
| dot11QosACKFailureCount | Counter32, |
| dot11QosReceivedFragmentCount | Counter32, |
| dot11QosTransmittedFrameCount | Counter32, |
| dot11QosDiscardedFrameCount | Counter32, |
| dot11QosMPDUsReceivedCount | Counter32, |
| dot11QosRetriesReceivedCount | Counter32} |

504 → dot11QosTransmittedFrameCount
506 → dot11QosMPDUsReceivedCount

```
dot11CountersTable OBJECT-TYPE                                    602
    SYNTAX SEQUENCE OF Dot11CountersEntry
    MAX-ACCESS not-accessible
    STATUS current
    DESCRIPTION
    "Group containing attributes that are MAC counters. Implemented as a table to allow
    for multiple instantiations on an agent."
    ::= { dot11mac 2 }

602
dot11CountersEntry OBJECT-TYPE
    SYNTAX Dot11CountersEntry
    MAX-ACCESS not-accessible
    STATUS current
    DESCRIPTION
    "An entry in the dot11CountersEntry Table.
    ifIndex - Each IEEE 802.11 interface is represented by an ifEntry. Interface tables in this
    MIB module are indexed by ifIndex."
    INDEX { ifIndex }
    ::= { dot11CountersTable 1 }

602

Dot11CountersEntry ::= SEQUENCE {  dot11TransmittedFragmentCount  Counter32,
        dot11MulticastTransmittedFrameCount          Counter32,
        dot11FailedCount                             Counter32,
        dot11RetryCount                              Counter32,
        dot11MultipleRetryCount                      Counter32,
        dot11FrameDuplicateCount                     Counter32,
        dot11RTSSuccessCount                         Counter32,
        dot11RTSFailureCount                         Counter32,
        dot11ACKFailureCount                         Counter32,
        dot11ReceivedFragmentCount                   Counter32,
        dot11MulticastReceivedFrameCount             Counter32,
        dot11FCSErrorCount                           Counter32,
        dot11TransmittedFrameCount                   Counter32,
        dot11WEPUndecryptableCount                   Counter32,
        dot11QosDiscardedFragmentCount               Counter32,         604
        dot11AssociatedStationCount                  Counter32,
        dot11QosCFPollsReceivedCount                 Counter32,
        dot11QosCFPollsUnusedCount                   Counter32,
        dot11QosCFPollsUnusableCount                 Counter32 }
```

```
ifTable OBJECT-TYPE
        SYNTAX      SEQUENCE OF IfEntry
        ACCESS      not-accessible
        STATUS mandatory
        DESCRIPTION
                "A list of interface entries. The number of entries is given by the value of ifNumber."
        ::= { interfaces 2 }
```

704

```
ifEntry OBJECT-TYPE
        SYNTAX IfEntry
        ACCESS not-accessible
        STATUS mandatory
        DESCRIPTION
                "An interface entry containing objects at the subnetwork layer and below for a particular interface."
        INDEX { ifIndex }
        ::= { ifTable 1 }

IfEntry ::=
        SEQUENCE {
                ifIndex         INTEGER,
                ifDescr         DisplayString,
                ifType          INTEGER,
                ifMtu           INTEGER,
                ifSpeed         Gauge,
                ifPhysAddress   PhysAddress,
                ifAdminStatus   INTEGER,
                ifOperStatus    INTEGER,
                ifLastChange    TimeTicks,
                ifInOctets      Counter,
                ...
                ifSpecific      OBJECT IDENTIFIER
        }
```

706

```
ifOperStatus OBJECT-TYPE
        SYNTAX INTEGER {
                up(1),          -- ready to pass packets
                down(2),
                testing(3)      -- in some test mode
        }
        ACCESS read-only
        STATUS mandatory
        DESCRIPTION
                "The current operational state of the interface. The testing(3) state indicates that no operational
                packets can be passed."
        ::= { ifEntry 8 }
```

PERFORMANCE MONITORING OF WIRELESS LOCAL AREA NETWORK (WLAN) OFFLOADING IN WIRELESS CELLULAR NETWORKS

CROSS-REFERENCE TO RELATED APPLICATIONS

The present patent application is related to and claims priority to U.S. Provisional Patent Application Ser. No. 61/748,706, filed Jan. 3, 2013, the contents of which are incorporated herein by reference in their entirety.

FIELD

The present disclosure relates to performance monitoring, and more particularly, to performance monitoring of Wireless Local Area Network (WLAN) offloading in wireless cellular networks.

BACKGROUND

The accelerated adoption of smartphones, tablets and cloud computing has resulted in the rapid growth of global mobile data traffic. Projections indicate that a 26-fold increase in mobile data traffic may be expected by 2015, compared to 2010, with data traffic reaching a rate of 6.3 exabytes per month. The scaling of network capacity through deployment of additional base stations and the implementation of new technology may be of limited effectiveness in dealing with this growth since mobile data pricing tends to remain relatively flat.

One approach to this problem involves offloading of data traffic from the mobile wireless cellular network, for example a 3GPP Long Term Evolution (LTE) or LTE-Advanced (LTE-A) network, to a Wireless Local Area Network (WLAN). In this scenario, a wireless mobile device, for example User Equipment (UE), which is served by a cell base station, for example an evolved Node B (eNB), may offload some or all of the data traffic to an available WLAN access point. A mechanism for monitoring the performance of this configuration is needed, however, to ensure efficient and reliable operation of the system so that the objectives of mobile data offload are achieved.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 5 illustrates a data structure associated with one example embodiment consistent with the present disclosure;

FIG. 6 illustrates a data structure associated with another example embodiment consistent with the present disclosure;

FIG. 7 illustrates a data structure associated with another example embodiment consistent with the present disclosure:

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods for performance monitoring of WLAN data traffic offloading in wireless cellular networks, for example an LTE or LTE-A network. In response to increasing data traffic, a UE (e.g., mobile cellular device) may offload data traffic from a serving cell eNB to an available WLAN access point (AP). The WLAN AP may be configured to measure the number of offloading UEs and the packet throughput from those UEs to the AP. The WLAN AP may also be configured to generate an offloading performance report based on these measurements and to transmit the report to an integration reference point (IRP) manager. The WLAN AP may further be configured to provide operational status messages (e.g., interrupted service state or restored service state) regarding its own state to the IRP manager.

The IRP manager may be configured to receive offloading performance reports from WLAN APs and to correlate this data with performance measurements received from eNBs to calculate system wide data traffic offload performance and operational efficiency.

Figure 1:
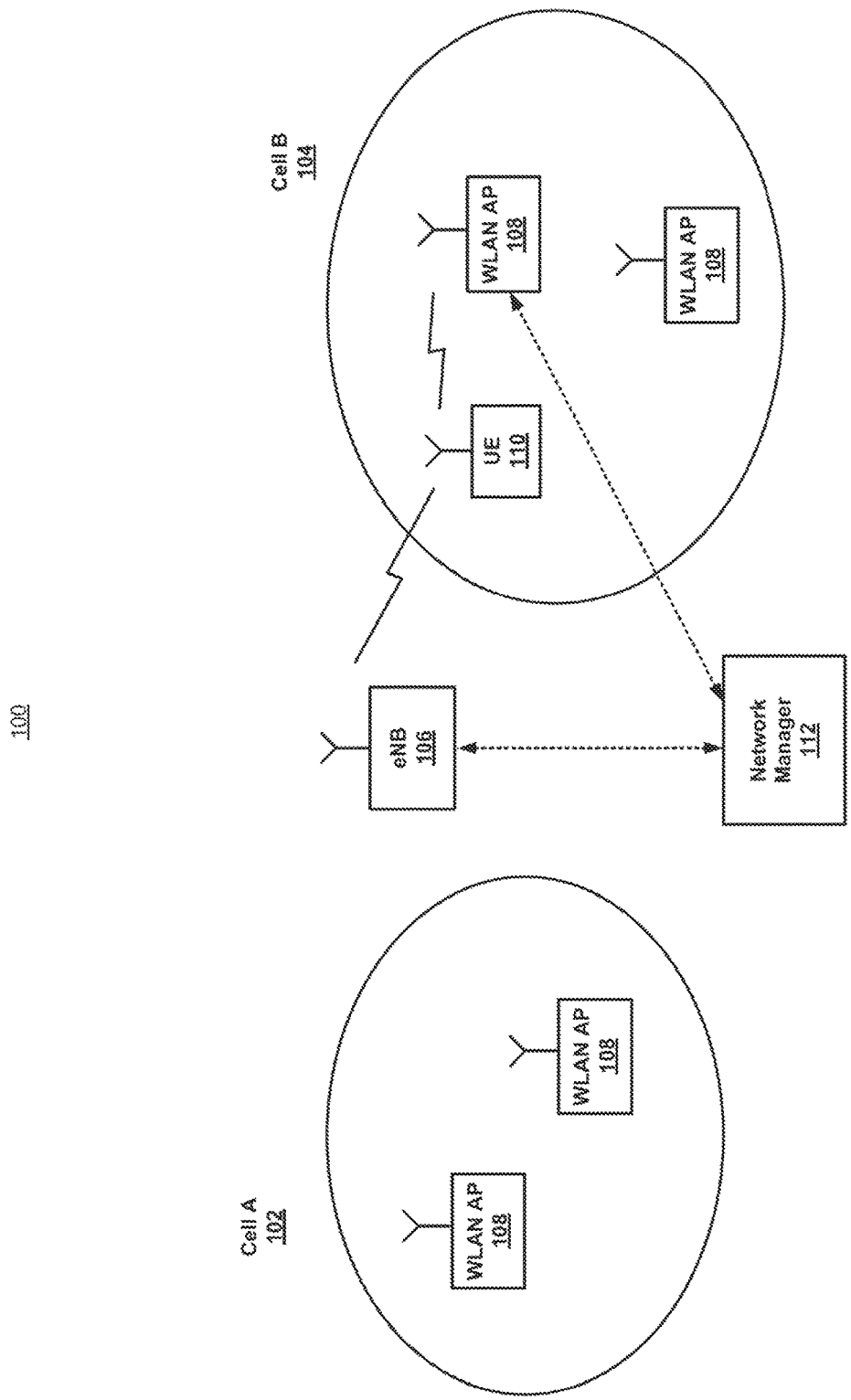
FIG. 1 illustrates a top level system diagram of one example embodiment consistent with the present disclosure.

FIG. 1 illustrates a top level system diagram 100 of one example embodiment consistent with the present disclosure. A wireless network is shown to include cell coverage areas Cell A 102 and Cell B 104 which may be served by an eNB 106. In another example embodiment, eNB 106 may provide coverage to two sectors, Cell A 102 and Cell B 104. Any number of WLAN APs 108 may be located or overlain in the network area of Cell A 102 or Cell B 104. A UE 110 may typically be configured to transmit voice and data traffic to and from the eNB 106. In some instances, however, for example under increased traffic conditions, the UE 110 may offload some or all of the data traffic from the eNB 106 to one or more of the WLAN APs 108. Network manager 112 may be configured to communicate with both the WLAN APs and the eNBs in the network, to monitor the data offloading performance and to ensure increased efficiency and reliability of the system operation, as will be described in greater detail below.

While this is a simplified example, for illustration purposes, it will be appreciated that in practice any configuration of eNBs, UEs and WLAN APs of various types may be deployed and may provide coverage extending to any number or areas, regions or sectors. The wireless network may comply with, or otherwise be compatible with, the Third Generation Partnership Project (3GPP) Long Term Evolution (LTE) and/or LTE-Advanced (LTE-A) based wireless network standard, including current, previous and future versions of that standard.

Figure 2:
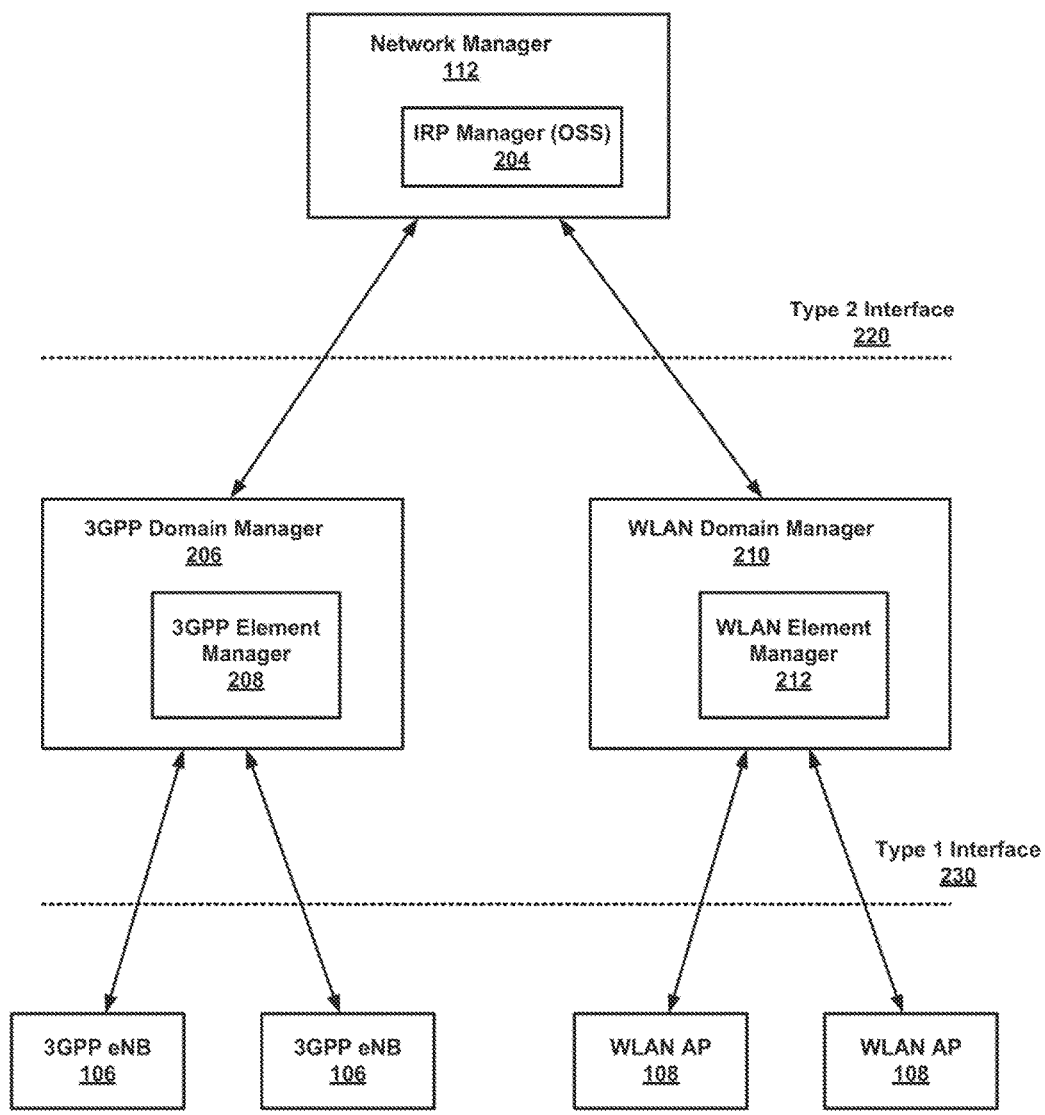
FIG. 2 illustrates a block diagram of one example embodiment consistent with the present disclosure.

FIG. 2 illustrates a block diagram 200 of one example embodiment consistent with the present disclosure. The network manager 112 is shown to include an IRP manager 204, also known as an operations support system (OSS). An IRP manager or OSS is typically a computer system and/or software application configured to provide and facilitate network support functions to network operators or providers. These support functions may include performance monitoring and fault detection. The IRP manager 204 may be configured to communicate with the 3GPP eNBs 106 through a 3GPP domain manager 206 which may include a 3GPP element manager 208. 3GPP domain manager 206 may be configured to provide both element and domain management function for a sub-network, while 3GPP element manager 208 may be configured to provide a set of end-user functions for management of a set of related types of network elements, for example 3GPP eNBs 106.

The IRP manager 204 may also be configured to communicate with the WLAN APs 108 through a WLAN domain manager 210 which may include a WLAN element manager 212. WLAN domain manager 210 may be configured to provide both element and domain management function for a sub-network, while WLAN element manager 212 may be configured to provide a set of end-user functions for management of a set of related types of network elements, for example WLAN APs 108.

The 3GPP domain manager 206 and the WLAN domain manager 210 may be configured to provide a type 2 interface 220 to the network manager 112, which may be a standardized interface, while providing a type 1 interface 230 to the eNBs 106 and WLAN APs 108, which may be a proprietary interface. IRP manager 204 may be configured to communicate with an IRP Agent residing in WLAN element manager 212 via type 2 interface 220. Any message translation that may be required between these two types of interfaces may be performed by the 3GPP domain manager 206 and the WLAN domain manager 210 (which may include the IRP Agent configured, at least in part, for this purpose).

Figure 3:
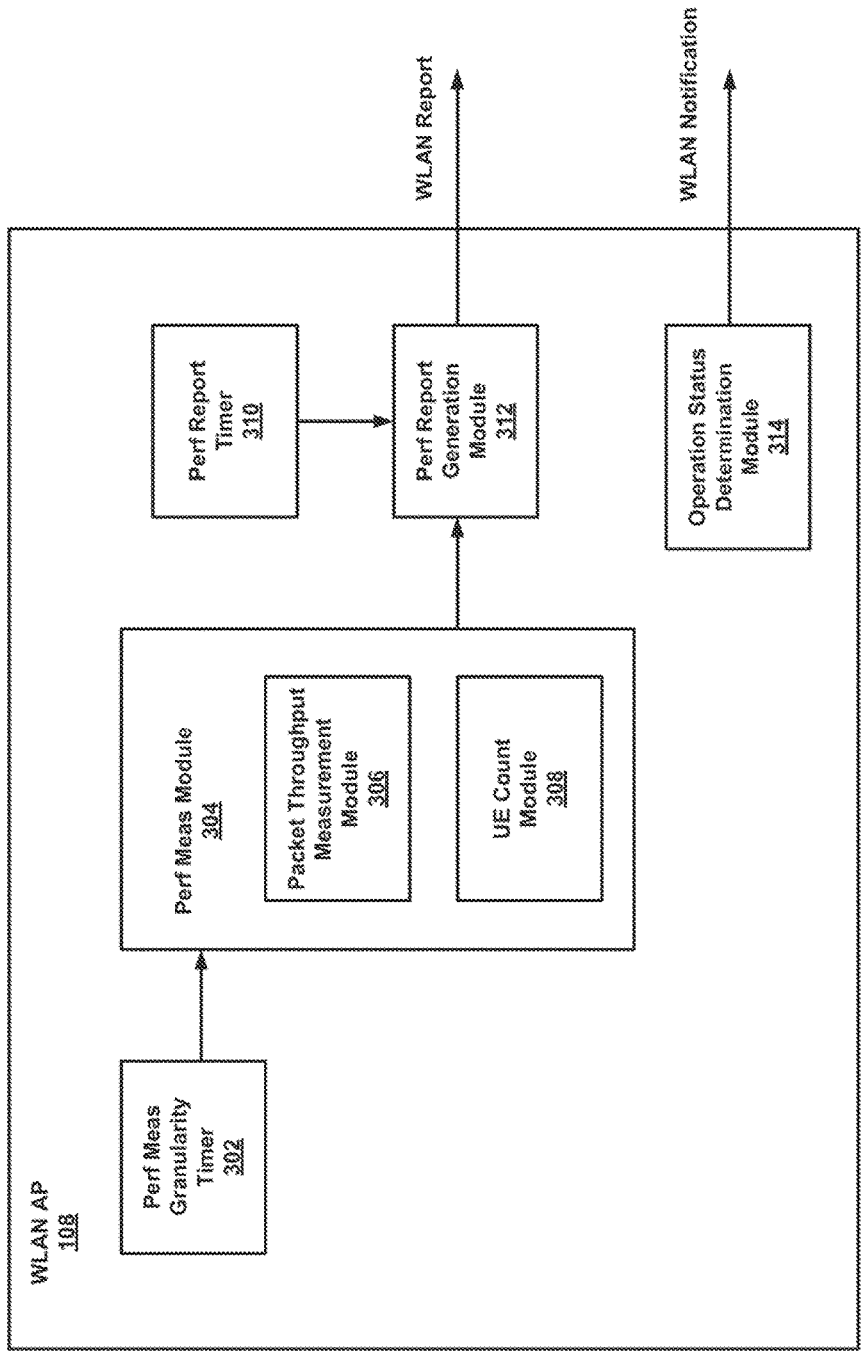
FIG. 3 illustrates a block diagram of another example embodiment consistent with the present disclosure.

FIG. 3 illustrates a block diagram 300 of another example embodiment consistent with the present disclosure. The WLAN AP 108 is shown to include a performance measurement granularity timer 302, a performance measurement module 304, a performance report timer 310, a performance report generation module 312 and an operation status determination module 314. The performance measurement module 304 is further shown to include a packet throughput measurement module 306 and a UE count module 308.

The performance measurement granularity timer 302 may be configured to trigger the performance measurements at the WLAN AP such that they occur at pre-determined or programmable intervals of suitable duration. In response to the granularity timer 302 triggering a measurement, the performance measurement module 304 measures data packet throughput, using module 306 for example, and measures the number of connected UEs, using module 308 for example. The packet throughput measures the volume of data being transmitted, for example though a media access control (MAC) or internet protocol (IP) layer, per unit of elapsed time, and therefore provides an indication of the activity and loading of the WLAN AP from the UEs. In some embodiments, the measured packet throughput may be associated with a quality of service (QoS) class or with a user priority class. The UE count indicates the number of UEs that are associated with or connected to a given WLAN AP. This may be useful in assessing offload performance. For example, a relatively low packet throughput in combination with a relatively high UE count may indicate poor WLAN performance. As another example, a relatively low UE count associated with a WLAN AP, during a time of anticipated high traffic (e.g., rush hour), may indicate a problem with the WLAN AP causing UE connection difficulties.

The performance report timer 310 may be configured to trigger the performance report generation module 312 to generate performance reports at pre-determined or programmable intervals of suitable duration. In response to the report timer 310 trigger, the performance report generation module 312 generates a performance report based on the measured packet throughput and UE count. The WLAN performance report may then be transmitted to the WLAN element manager 212, via the type 1 interface 230, and then to the OSS or IRP manager 204, via the type 2 interface 220.

Operation status determination module 314 may be configured to determine the operation status of the WLAN AP 108. Operational status may include a state of interrupted service and a state of restored service. Interrupted service may be associated with a failure of the WLAN AP or a "fault" state. In some embodiments, the operational status may include a "test" state to indicate that the WLAN AP is in a test mode and not currently transmitting packets. This "test" state may be a temporary state. A WLAN notification or message may be sent by the operation status determination module 314 to the WLAN element manager 212, via the type 1 interface 230, and then to the OSS or IRP manager 204, via the type 2 interface 220. In some embodiments, the WLAN notification may be combined with the WLAN performance report and may be transmitted as one or more data elements or counters associated with a management information base (MIB) message.

Figure 4:
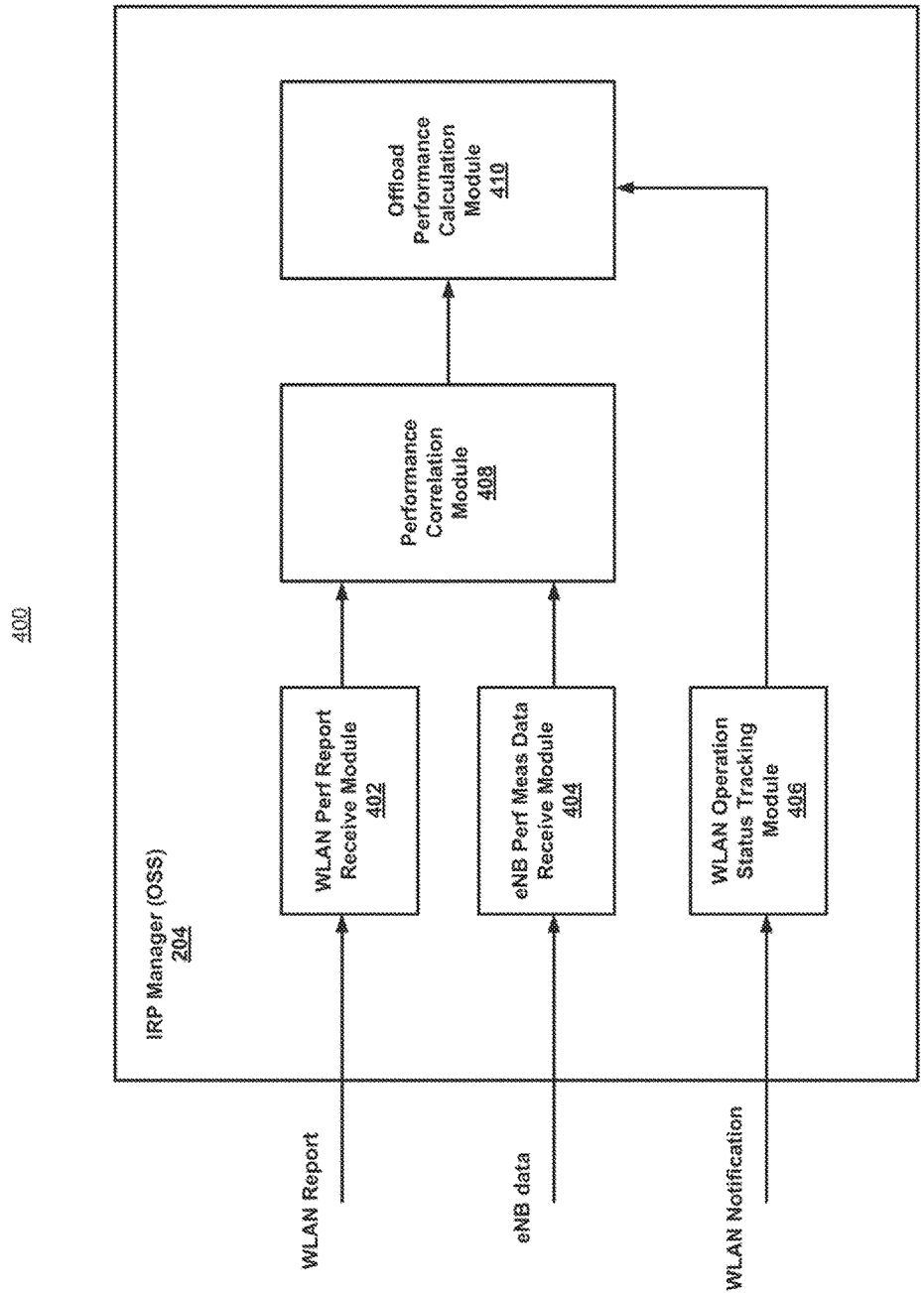
FIG. 4 illustrates a block diagram of another example embodiment consistent with the present disclosure.

FIG. 4 illustrates a block diagram 400 of another example embodiment consistent with the present disclosure. The IRP manager (or OSS) 204 is shown to include a WLAN performance report receiver module 402, an eNB performance measurement data receiver module 404, a WLAN operation status tracking module 406, a performance correlation module 408 and an offload performance calculation module 410.

The WLAN performance report receiver module 402 may be configured to receive the WLAN performance report generated by one or more WLAN APs as described above. The eNB performance measurement data receiver module 404 may be configured to receive performance measurement data from one or more eNBs 106. The eNB measurement data may provide information, collected by the eNB, related to the data traffic sent or received from the UEs served by that eNB at any given time. The WLAN measurement data may provide information, collected by the WLAN AP, related to the data traffic sent or received from the UEs served by that WLAN AP. The performance correlation module 408 may be configured to correlate the WLAN performance data from module 402 with the eNB performance data from module 404 to determine the volume of data traffic that has been offloaded from the eNB to one or more WLAN APs that are overlaid in the cell served by the eNB at any given time.

WLAN operation status tracking module 406 may be configured to receive operation status notifications from WLAN APs 108 and track their status, for example whether in or out of service (interrupted or restored service).

The WLAN operational status may be provided, along with the performance correlation data from module 408, to offload performance calculation module 410 which may be configured to calculate the data traffic offload performance for WLAN APs within the domains of the network manager 202. For example, if the eNB provided performance measurements show an increase in the offloaded data packet throughput to the WLAN APs, then there is a relatively good indication that the overlaid WLAN APs are performing as expected. Similarly, if the operation status of a WLAN AP remains in an interrupted state for a period of time that exceeds an acceptable threshold, then another type of problem may be indicated and corrective action (e.g., maintenance) may be called for.

In some embodiments, the performance information may be received from the WLAN APs and the eNBs as one or more data elements or counters associated with a management information base (MIB) message.

FIGS. 5 through 7 illustrate data structures and/or message fields, for example in an MIB message, that may comply with, or otherwise be compatible with, the 3GPP LTE and/or LTE-A based wireless network standard and/or the IEEE 802.11 wireless standard, including current, previous and future versions of these standards.

FIG. 5 illustrates a data structure 500 associated with one example embodiment consistent with the present disclosure. The WLAN element manager 212 may be configured to receive an MIB message that includes a Dot11QosCountersEntry 502 that provides a dot11QosTransmittedFrameCount 504 and dot11QosMPDUsReceivedCount 506. These data elements or counters 504, 506 may be configured to indicate data packet offload throughput associated with a WLAN AP. In some embodiments, the data throughput may be associated with a QoS class or user priority class. The WLAN element manager 212 may be configured to convert dot11QosTransmittedFrameCount 504 and dot11QosMPDUsReceivedCount 506 into a format acceptable by the IRP manager 204, and then forward it to the IRP manager 204.

FIG. 6 illustrates a data structure 600 associated with another example embodiment consistent with the present disclosure. The WLAN element manager 212 may be configured to receive an MIB message that includes a Dot11CountersEntry 602 that provides a dot11AssociatedStationCount 604. This data element or counter 604 may be configured to indicate the number of UEs connected to a WLAN AP for data traffic offload. The WLAN element manager 212 may be configured to convert the dot11AssociatedStationCount counter 604 into a format acceptable by the IRP manager 204, and then forward it to the IRP manager 204

FIG. 7 illustrates a data structure 700 associated with another example embodiment consistent with the present disclosure. The WLAN element manager 212 may be configured to receive an MIB message that includes an interface table (ifTable) 702 which further includes an interface entry (ifEntry) 704 that provides an operational status indicator for the WLAN AP (ifOperStatus) 706. This data element 706 may be configured to indicate the operational status as "up," "down," or "testing." An "up" status may indicate that the WLAN AP is operational (or restored to operational from a previous state) and ready to pass data packets. A "down" status may indicate that the WLAN AP is experiencing a service interruption of some type and may not be ready to pass data packets. This may be a temporary condition or corrective action may be needed. A "testing" status may indicate that the WLAN AP is in a test mode and may not be ready to pass data packets. Other suitable states may also be indicated as needed. The WLAN element manager 212 may be configured to convert the ifOperStatus 706 into a format acceptable by the IRP manager 204, and then forward it to the IRP manager 204.

Figure 8:
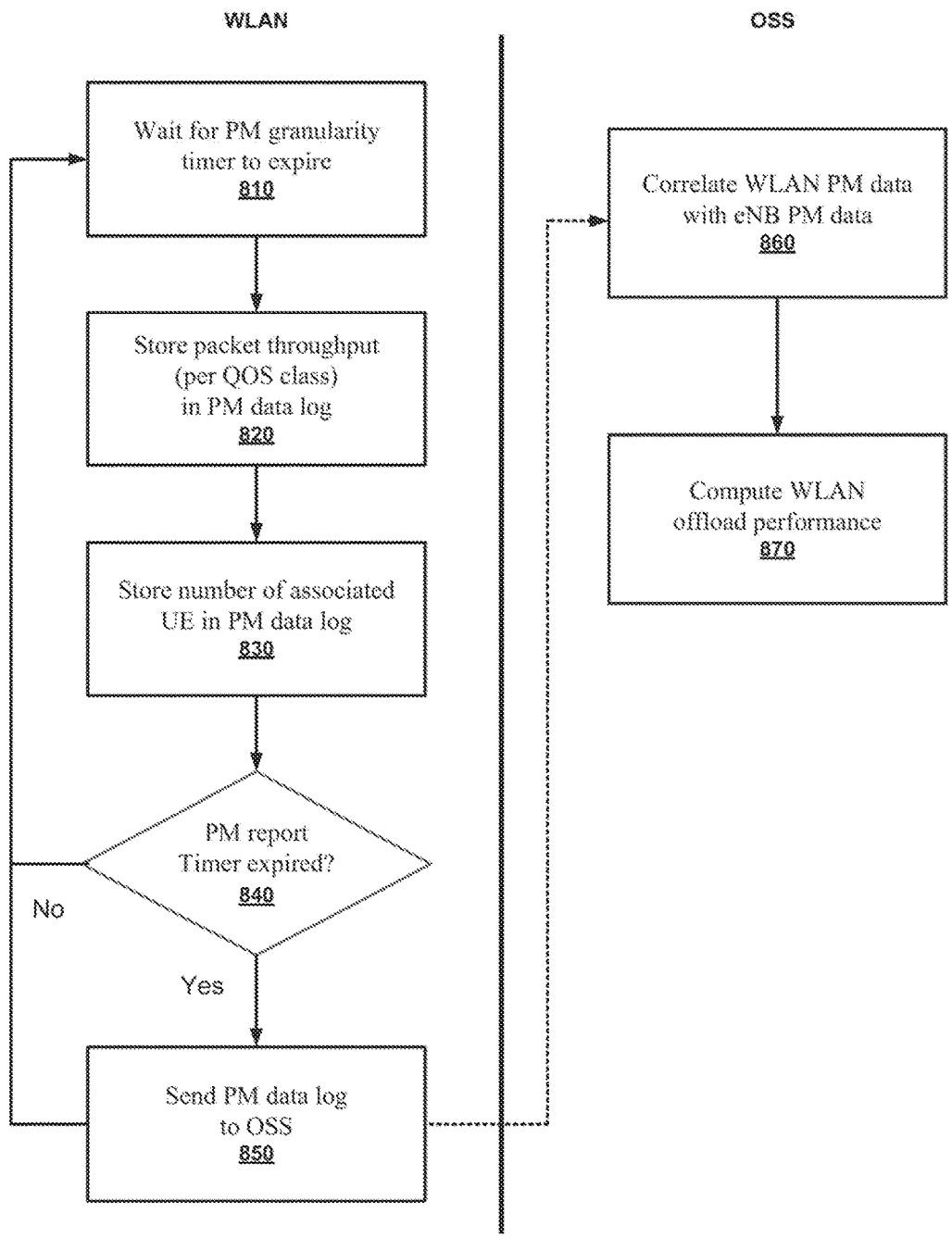
FIG. 8 illustrates a flowchart of operations of an example embodiment consistent with the present disclosure.

FIG. 8 illustrates a flowchart of operations 800 of an example embodiment consistent with the present disclosure. At operation 810, a WLAN AP waits for a performance measurement (PM) granularity timer to expire. At operation 820, the WLAN AP stores packet throughput measurements in a PM data log. The throughput information may be associated with a QoS or User Priority class. At operation 830, the number of UEs associated with the WLAN AP is stored in the PM data log. At operation 840, if the PM report timer has expired then, at operation 850, the PM data log is sent to the OSS. The process is then repeated for the WLAN AP at operation 810.

At operation 860, the OSS correlates the received WLAN PM data with additional PM data received from an eNB. At operation 870, the OSS computes the WLAN offload performance based on the correlations.

Figure 9:
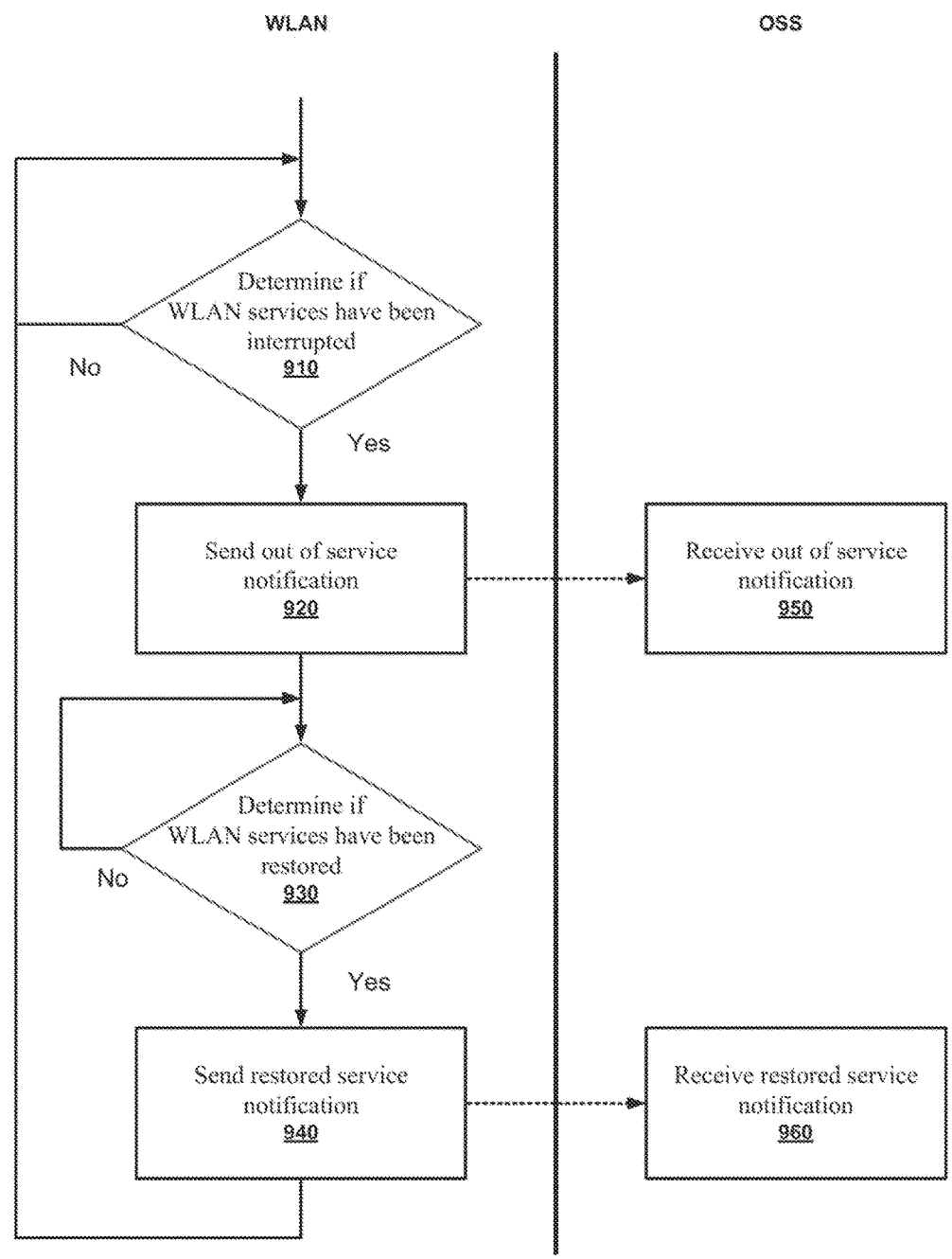
FIG. 9 illustrates a flowchart of operations of another example embodiment consistent with the present disclosure.

FIG. 9 illustrates a flowchart of operations 900 of another example embodiment consistent with the present disclosure. At operation 910, a determination is made as to whether WLAN services have been interrupted. At operation 920, if services have been interrupted, a out of service or "fault" notification is sent from the WLAN AP to the OSS. At operation 930, a determination is made as to whether WLAN services have been restored. At operation 940, if services have been restored, a restored service notification is sent from the WLAN AP to the OSS. The process is then repeated for the WLAN AP at operation 910. At operation 950, the OSS receives the out of service notification and, at operation 960, the OSS receives the restored service notification.

Figure 10:
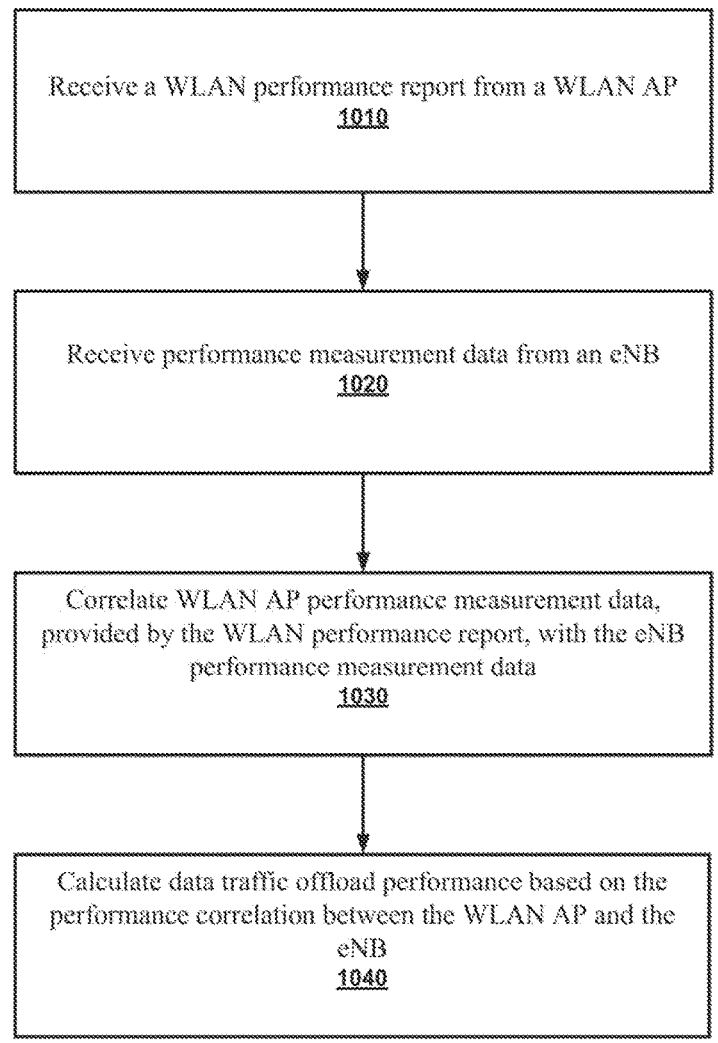
FIG. 10 illustrates a flowchart of operations of another example embodiment consistent with the present disclosure.

FIG. 10 illustrates a flowchart of operations 1000 of another example embodiment consistent with the present disclosure. At operation 1010, a WLAN performance report is received from a WLAN AP. At operation 1020, performance measurement data is received from an eNB. At operation 1030, WLAN AP performance measurement data, provided by the WLAN performance report, is correlated with the eNB performance measurement data. At operation 1040, data traffic offload performance is calculated based on the performance correlation between the WLAN AP and the eNB.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all sub-combinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides devices, methods, systems and computer-readable storage medium for performance monitoring of WLAN data traffic offloading in wireless cellular networks. The following examples pertain to further embodiments.

According to one aspect there is provided a WLAN AP. The WLAN AP may include a performance measurement module to measure the number of UEs connected to the WLAN AP for data traffic offload and further to measure packet throughput from the UEs to the WLAN AP. The WLAN AP of this example may also include a measurement granularity timer to trigger the performance measurement module to perform the measurements. The WLAN AP of this example may further include a performance report generation module to generate a WLAN report based on the measurements provided from the performance measurement module. The WLAN AP of this example may further include a performance report timer to trigger the performance report generation module to generate the WLAN report.

Another example WLAN AP includes the forgoing components and the measured packet throughput is associated with a QoS class or a User Priority class.

Another example WLAN AP includes the forgoing components and further includes an operation status determination module to determine if the WLAN AP is in an interrupted service state or a restored service state and further to generate a notification of the service state.

Another example WLAN AP includes the forgoing components and the WLAN report is provided to an IRP manager.

Another example WLAN AP includes the forgoing components and the service state notification is provided to an IRP manager.

Another example WLAN AP includes the forgoing components and the WLAN AP communicates to the IRP manager through an IRP agent of a WLAN element manager to provide a standardized interface to the IRP manager.

Another example WLAN AP includes the forgoing component and the IRP agent converts the packet throughput and the number of connected UE to a format compatible with the standardized interface and with the IRP manager.

Another example WLAN AP includes the forgoing components and the WLAN report and the service state notification are incorporated in one or more data elements associated with an MIB message.

According to another aspect there is provided a method. The method may include waiting for expiration of a performance measurement granularity timer. The method of this example may also include measuring the number of UEs connected to a WLAN AP for data traffic offload. The method of this example may further include measuring packet throughput from the UEs to the WLAN AP. The method of this example may further include storing the measured number of UEs and packet throughput in a performance data log. The method of this example may further include, in response to an expiration of a report timer, transmitting the performance data log to an IRP manager.

Another example method includes the forgoing operations and the measured packet throughput is associated with a QoS class or a User Priority class.

Another example method includes the forgoing operations and further includes determining if the WLAN AP is in an interrupted service state or a restored service state and generating a notification of the service state.

Another example method includes the forgoing operations and the service state notification is transmitted to the IRP manager.

Another example method includes the forgoing operations and further includes providing a standardized interface to the IRP manager through an IRP agent of a WLAN element manager for the transmission to the IRP manager Another example method includes the forgoing operations and further includes incorporating the performance data log and the service state notification in one or more data elements associated with an MIB message.

According to another aspect there is provided an IRP manager. The IRP manager may include a WLAN performance report receiving module to receive a WLAN performance report from a WLAN AP. The IRP manager of this example may also include an eNB performance measurement data receiving module to receive performance measurement data from an eNB. The IRP manager of this example may further include a performance correlation module to correlate WLAN AP performance measurement data, provided by the WLAN performance report, with the eNB performance measurement data. The IRP manager of this example may further include an offload performance calculation module to calculate data traffic offload performance based on the performance correlation between the WLAN AP and the eNB.

Another example IRP manager includes the forgoing components and further includes a WLAN AP operation status tracking module to receive WLAN notifications and provide WLAN AP operation status updates based on the notifications to the offload performance calculation module, and the calculated data traffic offload performance is further based on the provided WLAN AP operation status.

Another example IRP manager includes the forgoing components and the WLAN AP performance measurement data includes the number of UEs connected to the WLAN AP and packet throughput from the UEs to the WLAN AP.

Another example IRP manager includes the forgoing components and the packet throughput is associated with a QoS class or a User Priority class.

Another example IRP manager includes the forgoing components and the WLAN AP operation status is an interrupted service state or a restored service state.

Another example IRP manager includes the forgoing components and the WLAN AP performance measurement data and the WLAN AP operation status notification are incorporated in one or more data elements associated with an MIB message.

According to another aspect there is provided a method. The method may include receiving a WLAN performance report from one or more WLAN APs. The method of this example may also include receiving performance measurement data from an eNB. The method of this example may further include correlating WLAN AP performance measurement data, provided by the WLAN performance report, with the eNB performance measurement data. The method of this example may further include calculating data traffic offload performance based on the performance correlation between the WLAN AP and the eNB.

Another example method includes the forgoing operations and one or more of the WLAN APs overlay an eNB coverage area.

Another example method includes the forgoing operations and further includes receiving WLAN notifications from the WLAN AP and tracking WLAN AP operation status updates based on the notifications, and the calculated data traffic offload performance is further based on the tracked WLAN AP operation status.

Another example method includes the forgoing operations and the WLAN AP performance measurement data includes the number of UEs connected to the WLAN AP and packet throughput from the UEs to the WLAN AP.

Another example method includes the forgoing operations and the packet throughput is associated with a QoS class or a User Priority class.

Another example method includes the forgoing operations and the WLAN AP operation status is an interrupted service state or a restored service state.

Another example method includes the forgoing operations and further includes incorporating the WLAN AP performance measurement data and the WLAN AP operation status notification in one or more data elements associated with an MIB message.

According to another aspect there is provided a system. The system may include a means for waiting for expiration of a performance measurement granularity timer. The system of this example may also include a means for measuring the number of UEs connected to a WLAN AP for data traffic offload. The system of this example may further include a means for measuring packet throughput from the UEs to the WLAN AP. The system of this example may further include a means for storing the measured number of UEs and packet throughput in a performance data log. The system of this example may further include a means for, in response to an expiration of a report timer, transmitting the performance data log to an IRP manager.

Another example system includes the forgoing components and the measured packet throughput is associated with a QoS class or a User Priority class.

Another example system includes the forgoing components and further includes a means for determining if the WLAN AP is in an interrupted service state or a restored service state and means for generating a notification of the service state.

Another example system includes the forgoing components and the service state notification is transmitted to the IRP manager.

Another example system includes the forgoing components and further includes a means for providing a standardized interface to the IRP manager through an IRP agent of a WLAN element manager for the transmission to the IRP manager Another example system includes the forgoing components and further includes a means for incorporating the performance data log and the service state notification in one or more data elements associated with an MIB message.

According to another aspect there is provided a system. The system may include a means for receiving a WLAN performance report from one or more WLAN APs. The system of this example may also include a means for receiving performance measurement data from an eNB. The system of this example may further include a means for correlating WLAN AP performance measurement data, provided by the WLAN performance report, with the eNB performance measurement data. The system of this example may further include a means for calculating data traffic offload performance based on the performance correlation between the WLAN AP and the eNB.

Another example system includes the forgoing components and one or more of the WLAN APs overlay an eNB coverage area.

Another example system includes the forgoing components and further includes a means for receiving WLAN notifications from the WLAN AP and means for tracking WLAN AP operation status updates based on the notifications, and the calculated data traffic offload performance is further based on the tracked WLAN AP operation status.

Another example system includes the forgoing components and the WLAN AP performance measurement data includes the number of UEs connected to the WLAN AP and packet throughput from the UEs to the WLAN AP.

Another example system includes the forgoing components and the packet throughput is associated with a QoS class or a User Priority class.

Another example system includes the forgoing components and the WLAN AP operation status is an interrupted service state or a restored service state.

Another example system includes the forgoing components and further includes a means for incorporating the WLAN AP performance measurement data and the WLAN AP operation status notification in one or more data elements associated with an MIB message.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A wireless local area network (WLAN) access point (AP), comprising:
   a measurement granularity timer to trigger performance measurements, the measurement granularity timer being configured to expire based on a predetermined interval;
   performance measurement circuitry to measure a number of User Equipment (UEs) connected to said WLAN AP for data traffic offload and further to measure packet throughput from said UEs to said WLAN AP through a media access control (MAC) layer or an internet protocol (IP) layer for a first duration of time in response to the measurement granularity timer expiring;
   performance report generation circuitry to generate a WLAN report based on said measured packet throughput and said measured number of UEs provided from said performance measurement circuitry during at least said first duration of time; and a performance report timer to trigger said performance report generation circuitry to generate said WLAN report.

2. The WLAN AP of claim 1, wherein said measured packet throughput is associated with a Quality of Service (QoS) class or a User Priority class.

3. The WLAN AP of claim 1, further comprising an operation status determination circuitry to determine if said WLAN AP is in an interrupted service state or a restored service state and further to generate a notification of said service state.

4. The WLAN AP of claim 1, wherein said WLAN report is provided to an integration reference point (IRP) manager.

5. The WLAN AP of claim 3, wherein said service state notification is provided to an IRP manager.

6. A method comprising:

waiting for expiration of a performance measurement granularity timer;

measuring the number of UEs connected to a WLAN AP for data traffic offload for a first duration of time in response to the performance measurement granularity timer expiring;

measuring packet throughput from said UEs to said WLAN AP through a media access control (MAC) layer or an internet protocol (IP) layer;

storing said measured number of UEs and packet throughput during at least said first duration of time in a performance data log; and in response to an expiration of a report timer, transmitting said performance data log to an IRP manager.

7. The method of claim 6, wherein said measured packet throughput is associated with a Quality of Service (QoS) class or a User Priority class.

8. The method of claim 6, further comprising determining if said WLAN AP is in an interrupted service state or a restored service state and generating a notification of said service state.

9. The method of claim 8, wherein said service state notification is transmitted to said IRP manager.

10. The WLAN AP of claim 1, wherein said generated performance report includes an indication of said measured number of User Equipment (UEs) connected to said WLAN AP.

11. The WLAN AP of claim 6, wherein said performance data log transmitted to said IRP manager includes an indication of said number of measured UEs.

* * * * *